(12) United States Patent
Matsuo et al.

(10) Patent No.: US 8,561,900 B2
(45) Date of Patent: *Oct. 22, 2013

(54) DATA TRANSFER SYSTEM, DATA ACQUISITION DEVICE, DATA ACQUISITION METHOD, DATA ACCUMULATION DEVICE, DATA TRANSMISSION METHOD, AND PROGRAM FOR THE SAME

(75) Inventors: Takashi Matsuo, Tokyo (JP); Daisuke Kawakami, Tokyo (JP)

(73) Assignee: Sony Corporation, Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 12/987,707

(22) Filed: Jan. 10, 2011

(65) Prior Publication Data
US 2011/0105030 A1 May 5, 2011

Related U.S. Application Data

(63) Continuation of application No. 11/996,046, filed as application No. PCT/JP2006/313568 on Jul. 7, 2006.

(30) Foreign Application Priority Data

Jul. 19, 2005 (JP) ................................. 2005-208697

(51) Int. Cl.
*G06K 7/00* (2006.01)
(52) U.S. Cl.
USPC ............ 235/439; 235/441; 235/444; 235/454
(58) Field of Classification Search
USPC .................................. 235/439, 441, 444, 454
See application file for complete search history.

(56) References Cited

U.S. PATENT DOCUMENTS

| 5,299,197 | A | * | 3/1994 | Schlafly | ........................ 370/477 |
| 5,787,101 | A | | 7/1998 | Kelly | |
| 2001/0055988 | A1 | | 12/2001 | Blake et al. | |
| 2003/0218073 | A1 | | 11/2003 | Arimura | |
| 2004/0117378 | A1 | * | 6/2004 | Manandhar | ..................... 707/10 |
| 2004/0225762 | A1 | | 11/2004 | Poo | |

(Continued)

FOREIGN PATENT DOCUMENTS

| CA | 2201232 | * | 3/1997 |
| EP | 0798675 A2 | | 10/1997 |

(Continued)

OTHER PUBLICATIONS

Search and Examination Report for Singapore Patent Appln. No. 200800294-1, issued on Jan. 9, 2009.

(Continued)

*Primary Examiner* — Michael G Lee
*Assistant Examiner* — Tabitha Chedekel
(74) *Attorney, Agent, or Firm* — K&L Gates LLP

(57) ABSTRACT

A data acquisition device includes a wireless communication unit for performing wireless communication of data with a data accumulation device in which data is accumulated, a type registration unit wherein data types of necessary data are registered beforehand, a type comparison unit for comparing the data type of data received via the wireless communication unit with data types registered in the type registration unit, a data extracting unit for extracting only data of which the data type matches, and a data holding unit for holding the extracted data.

14 Claims, 10 Drawing Sheets

(56) References Cited

U.S. PATENT DOCUMENTS

| | | |
|---|---|---|
| 2005/0111420 A1 | 5/2005 | Fujii |
| 2005/0184165 A1 | 8/2005 | de Jong |
| 2006/0108411 A1 | 5/2006 | Macurek et al. |

FOREIGN PATENT DOCUMENTS

| | | |
|---|---|---|
| JP | 63-313289 | 12/1988 |
| JP | SHO 63-313289 | 12/1988 |
| JP | 09-269982 | 10/1997 |
| JP | HEI 09-269982 | 10/1997 |
| JP | 2001-160105 | 6/2001 |
| JP | 2003036258 | 2/2003 |
| JP | 2004-021776 | 1/2004 |
| JP | 2005-045557 | 2/2005 |
| JP | 2005-157695 | 6/2005 |
| JP | 2003-030084 | 1/2011 |

OTHER PUBLICATIONS

Shibuya, Atsushi, Non-contact Communications System, CIPO, 2,201,2232, pp. 1-34, Published on Mar. 29, 1996.

Japanese Patent Office, Office Action issued in connection with Japanese Patent Application No. 2005-208697 on Nov. 1, 2011. (4 pages).

Japanese Office Action issued May 17, 2011, for corresponding Japanese Appln. No. 2005-208697.

* cited by examiner

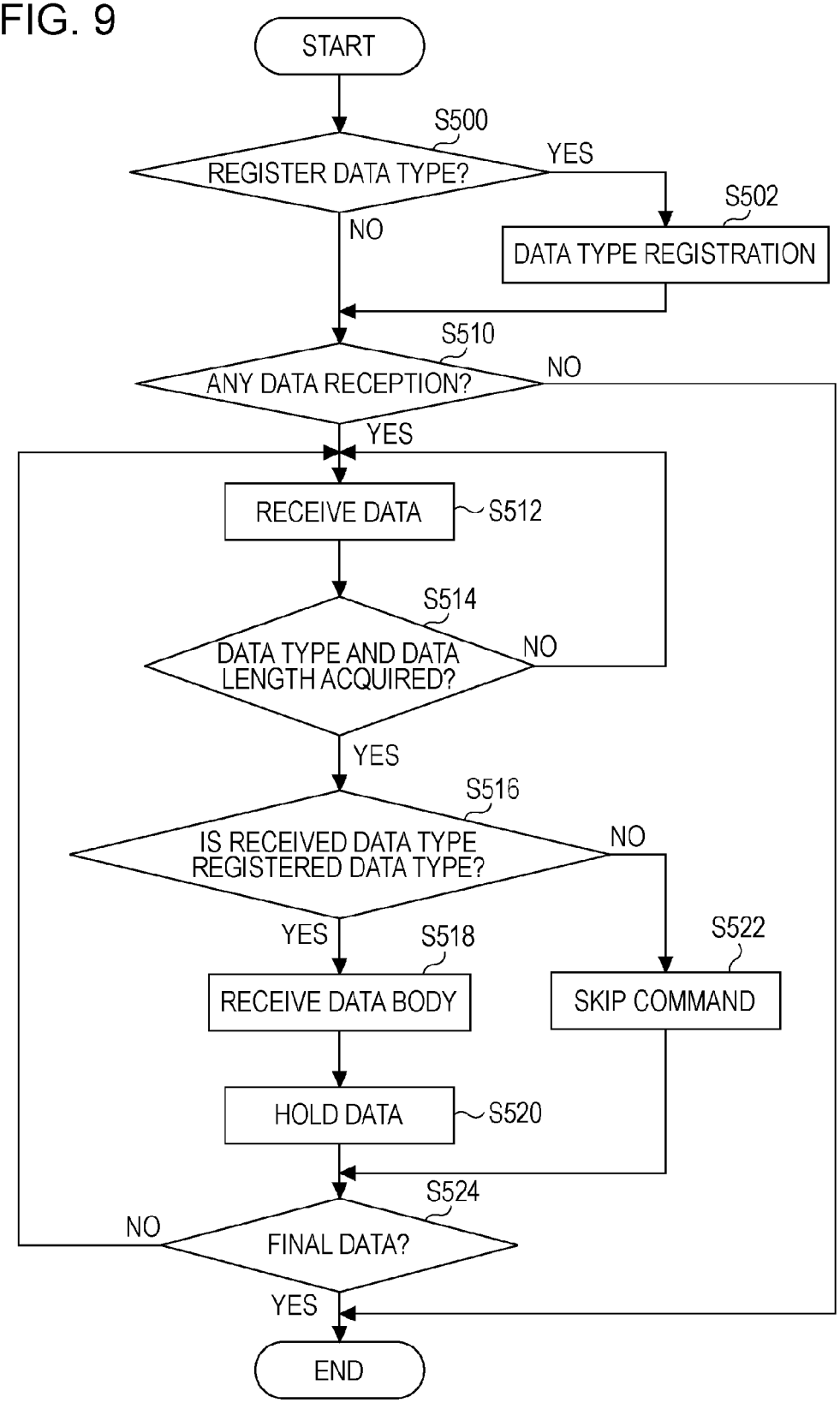

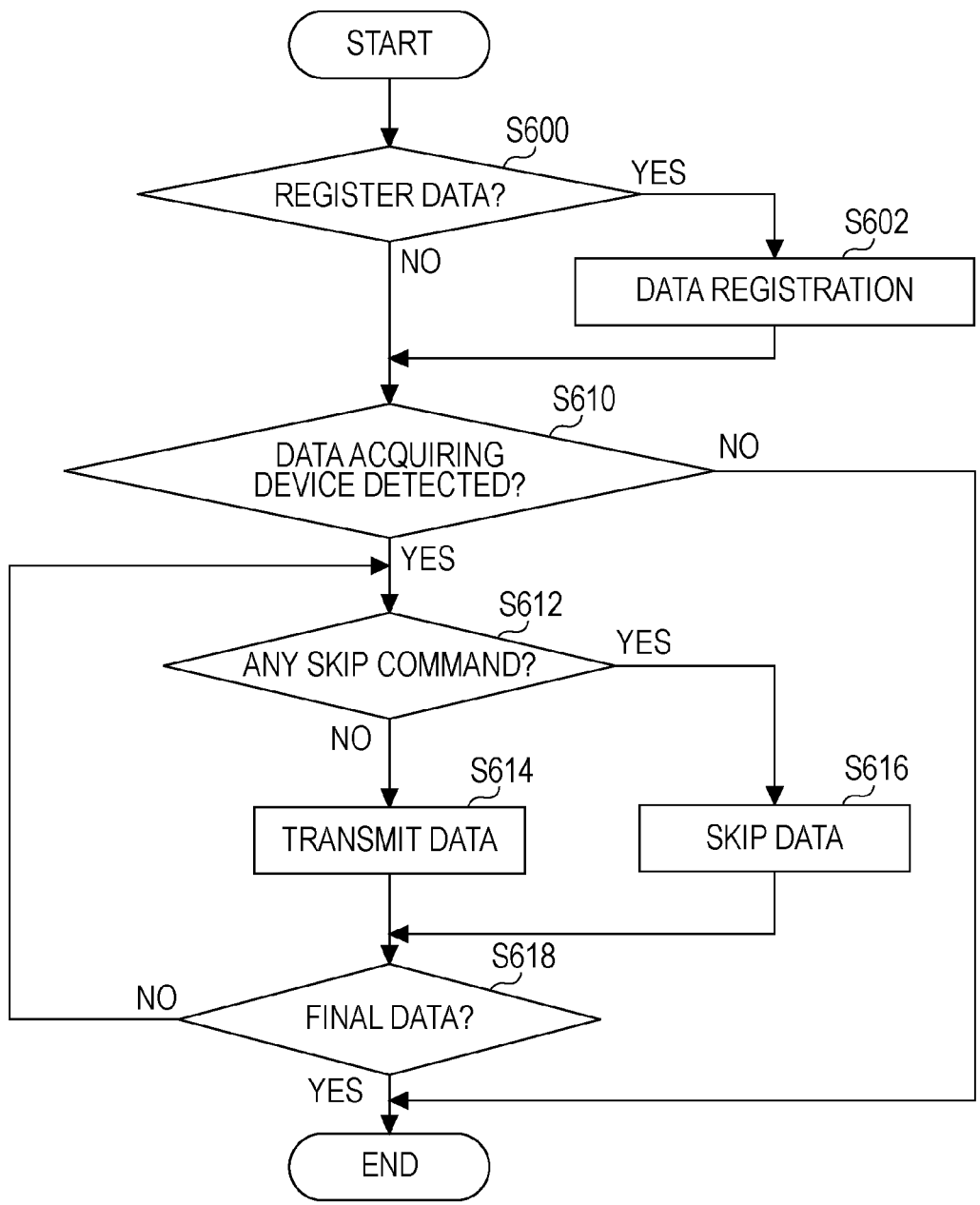

DATA TRANSFER SYSTEM, DATA ACQUISITION DEVICE, DATA ACQUISITION METHOD, DATA ACCUMULATION DEVICE, DATA TRANSMISSION METHOD, AND PROGRAM FOR THE SAME

CROSS REFERENCES TO RELATED APPLICATIONS

The present application is a continuation that claims priority to U.S. patent application Ser. No. 11/996,046 filed on Apr. 4, 2008, which is a 35 U.S.C. §371 filing based on PCT/JP06/313568 filed on Jul. 7, 2006, which claims priority to Japanese Patent Application JP 2005-208697 filed in the Japanese Patent Office on Jul. 19, 2005, the entire contents of which are incorporated herein by reference.

BACKGROUND

Nowadays, it has become quite commonplace to download various types of information from public communication networks such as the Internet to portable terminals such as cellular telephones and the like, and use the information.

Further, an art wherein IC tags or IC cards are embedded in advertisement posters displayed in public places, and individuals hold portable terminals such as cellular telephones and the like up to the posters to obtain information relating to the poster, such as URLs or the like, with new processing being performed based on the information, is in an implementation stage (e.g., Japanese Unexamined Patent Application Publication No. 2001-160105). Such IC tags and IC cards embedded in the posters are capable of non-contact wireless data communication, and are advantageous in that the external appearance of the posters is unaffected and that maintenance cost can be reduced.

Now, in the past, processing procedures for acquiring information relating to a poster from an IC tag or an IC card embedded in the poster involved all of the data stored in the IC tag or IC card to being first read into the portable terminal, with processing by an application in the portable terminal starting only after all of the data is read in. As of recent the amount of information to be acquired from IC tags and IC cards is tending to increase, due to the increase in the data storage capacity of memory. However, the communication standards used for acquiring the information cannot be easily changed as with memory capacity, and accordingly there is a problem arising that the amount of time over which the IC tag or IC card and the portable device are constrained is becoming longer.

Particularly, in the event that data saved in IC tags or IC cards in posters (so-called "smart posters") is great in size or includes multiple types of data, data which does not need to be acquired may be automatically acquired depending on the specifications of the portable terminal, and in the event that the communication speed for obtaining the data is slow, a considerable amount of time may be consumed for the data acquisition.

SUMMARY

The present disclosure has been made in light of the above-described problems regarding conventional data acquisition, and according to an embodiment of the present disclosure, there is provided a new and improved data transfer system, data acquisition device, data acquisition method, data accumulation device, data transmission method, and program for the same, capable of improving data processing efficiency by restricting saving or acquiring of unnecessary data.

With past communication standards such as described above, data processing is started after reading in all data, regardless of whether that data is necessary or unnecessary. With the present disclosure, the data type of the data is determined, and saving or acquiring of unnecessary data is avoided.

According to an embodiment of the present disclosure, there is provided a data transfer system, comprising: a data accumulation device for accumulating data; and a data acquisition device for acquiring data from the data accumulation device by wireless communication; the data accumulation device including a first wireless communication unit for performing wireless communication of data, a first data holding unit for holding data, and a data transmission unit for transmitting data held in the first data holding unit to the data acquisition device via the first wireless communication unit, in the event that the data acquisition device is within a communicable range; and the data acquisition device including a second wireless communication unit for performing wireless communication of data, a type registration unit wherein data types of necessary data are registered beforehand, a type comparison unit for comparing the data type of data received via the second wireless communication unit with data types registered in the type registration unit, a data extracting unit for extracting only data of which the data type matches, and a second data holding unit for holding the extracted data.

The data accumulation device includes IC tags and IC cards for advertisement posters, and the data acquisition device includes portable terminals such as cellular telephones. The data accumulation device detects that the data acquisition device is within a communicable range, and starts data transmission. The data acquisition device determines the necessity of data while acquiring the data, and generates new data from which unnecessary data has been removed.

According to another embodiment of the present disclosure, there is provided a data acquisition device comprising: a wireless communication unit for performing wireless communication of data with a data accumulation device in which data is accumulated; a type registration unit wherein data types of necessary data are registered beforehand; a type comparison unit for comparing the data type of data received via the wireless communication unit with data types registered in the type registration unit; a data extracting unit for extracting only data of which the data type matches; and a data holding unit for holding the extracted data.

According to such a configuration, whether or not certain received data is necessary can be determined based on the data type of the received data, and saving of necessary data alone can be realized. Accordingly, the efficiency of subsequent data processing can be improved.

The data acquisition device may further comprise a skip instruction unit for causing the data, accumulation device to skip transmission of data of which the data type has been determined to not match at the type comparison unit, with communication of data of which the data type does not match not being performed.

According to such a configuration, unnecessary transmission related to unnecessary data from the data accumulation device can be restricted, and data can be efficiently received in a short time even in cases wherein the communication speed with the data accumulation device is slow.

The data may be structured of sub-data units distinguished by data type, with each sub-data unit being structured of sub-data unit header information including data type and data length in that order, followed by a data body, and with the data extracting unit removing the data body of the length indicated in the data length in the event that the data type does not match. The data type indicates data attributes, and the data length indicates the length of the data body belonging to that data type, in bytes or the like. The data length may be made longer than the actual data body, taking into consideration the fact that data may be added to the data body in the future.

According to such a configuration wherein the data length information is referred to, the length of unnecessary data can be accurately known, so unnecessary data can be removed without involving other processes which would waste time, resources, etc.

The type registration unit may be capable of registration of data types of unnecessary data, with the data extraction unit omitting from extraction only data of which the data type matches that of the unnecessary data.

With the above-described type registration unit, necessary data types are registered and data other than the registered data types are deleted as unnecessary data. However, unknown data types and yet-to-be-created data types are not readily predicted for registration beforehand. Accordingly, the above configuration of the data acquisition device wherein unnecessary data types are registered enables necessary data to be acquired in a sure manner, without deleting necessary data as unnecessary.

The wireless communication may be performed using a Near Field Communication standard. Data accumulation devices which are the object of data acquisition are often exposed to the air as with advertisement posters, and accordingly non-contact wireless communication is effective. An example of such non-contact wireless communication which can be employed is NFC (Near Field Communication). The usable range of NFC is narrow, around 10 cm, and also has excellent security features, such as restricting the other party of communication by hand action.

The data may be sectioned into 16-byte blocks. For example, with the above-described NFC used for non-contact wireless communication, data units are structured of 16-byte blocks. This arrangement wherein the data is configured of greater block increments and more detailed individual byte increments enables the start point and end point of unnecessary data to be speedily and easily specified.

Also provided is a program according to an embodiment of the present disclosure, which causes a computer to function as the above-described data acquisition device.

Further provided is a data acquisition method according to another embodiment of the present disclosure, for acquiring data by wireless communication from a data accumulation device in which data is accumulated using the above data acquisition device, the method comprising the steps of: type registering wherein data types of necessary data are registered beforehand; data receiving wherein data is received from the data accumulation device; type comparing wherein the data type of data received via the wireless communication unit is compared with data types registered in the type registering; data extracting wherein only data of which the data type matches is extracted; and data holding wherein the extracted data is held.

According to another embodiment of the present disclosure, there is provided a data accumulation device comprising: a wireless communication unit for performing wireless communication of data; a data holding unit for holding data; a data transmission unit for transmitting data held in the data holding unit to the data acquisition device via the wireless communication unit, in the event that a data acquisition device for acquiring data from the data accumulation device is within a communicable range; and a skip execution unit for causing transmission of data of predetermined data types to be skipped, in response to instructions from the data acquisition device.

According to such a configuration of the data transmission unit, in the event that the data accumulation device and the data acquisition device are in a communicable range, following mutual authentication the data acquisition device can automatically extract data saved within the data accumulation device. Also, In the event that the data acquisition device has a skip instruction unit, unnecessary transmission of unnecessary data can be restricted in accordance with an instruction from the skip instruction unit (a skip instruction), and data can be efficiently received in a short time even in cases wherein the communication speed with the data accumulation device is slow.

The data may be structured of sub-data units distinguished by data type, with each sub-data unit being structured of sub-data unit header information including data type and data length in that order, followed by a data body, and with the skip execution unit causing the data body of the length indicated in the data length to be skipped for sub-data units belonging to predetermined data types, in response to instructions from the data acquisition device. This data length allows the length of unnecessary data to be accurately known, and so unnecessary data can be skipped without involving other processes which would waste time, resources, etc.

The wireless communication may be performed using a Near Field Communication standard. The usable range of NFC is narrow, around 10 cm, and also has excellent security features, such as restricting the other party of communication by hand action.

The data may be sectioned into 16-byte blocks. This arrangement wherein the data is configured of greater block increments and more detailed individual byte increments enables the start point and end point of unnecessary data to be speedily and easily specified.

The data accumulation device may be an IC tag or may be an IC card.

Also provided is a program according to an embodiment of the present disclosure, which causes a computer to function as the above-described data accumulation device.

Further provided is a data transmission method according to another embodiment of the present disclosure, using the data accumulation device, the method comprising the steps of: data registering wherein data is registered beforehand; object detecting wherein detection is made of a data acquisition device for acquiring data being within a communicable range; data transmitting wherein data registered in the data registering is transmitted to the data acquisition device in the event that the data acquisition device is detected in the object detecting; and skip executing wherein transmission of data of predetermined types is skipped in response to instructions from the data acquisition device.

Note that the data acquisition device and the data accumulation device may be configured of a single device. Further, the data holding unit of the data accumulation device and the data holding unit of the data acquisition device may be separately provided so as to communicate via the Internet or the like, and the components of the data acquisition device may be provided dispersed among separate devices.

According to the present disclosure as described above, restricting unnecessary saving or acquiring of data enables the efficiency of data processing to be improved, regardless of the communication standard and the communication speed thereof.

Also, there is no need to change communication standards or increase communication speed in connection to increased data capacity of the data accumulation device, so costs related to such changes can be reduced.

BRIEF DESCRIPTION OF THE DRAWINGS

FIG. 9 is a flowchart illustrating the flow of a data acquisition method; and

FIG. 10 is a flowchart illustrating the flow of a data transmission method.

DETAILED DESCRIPTION

Figure 1:
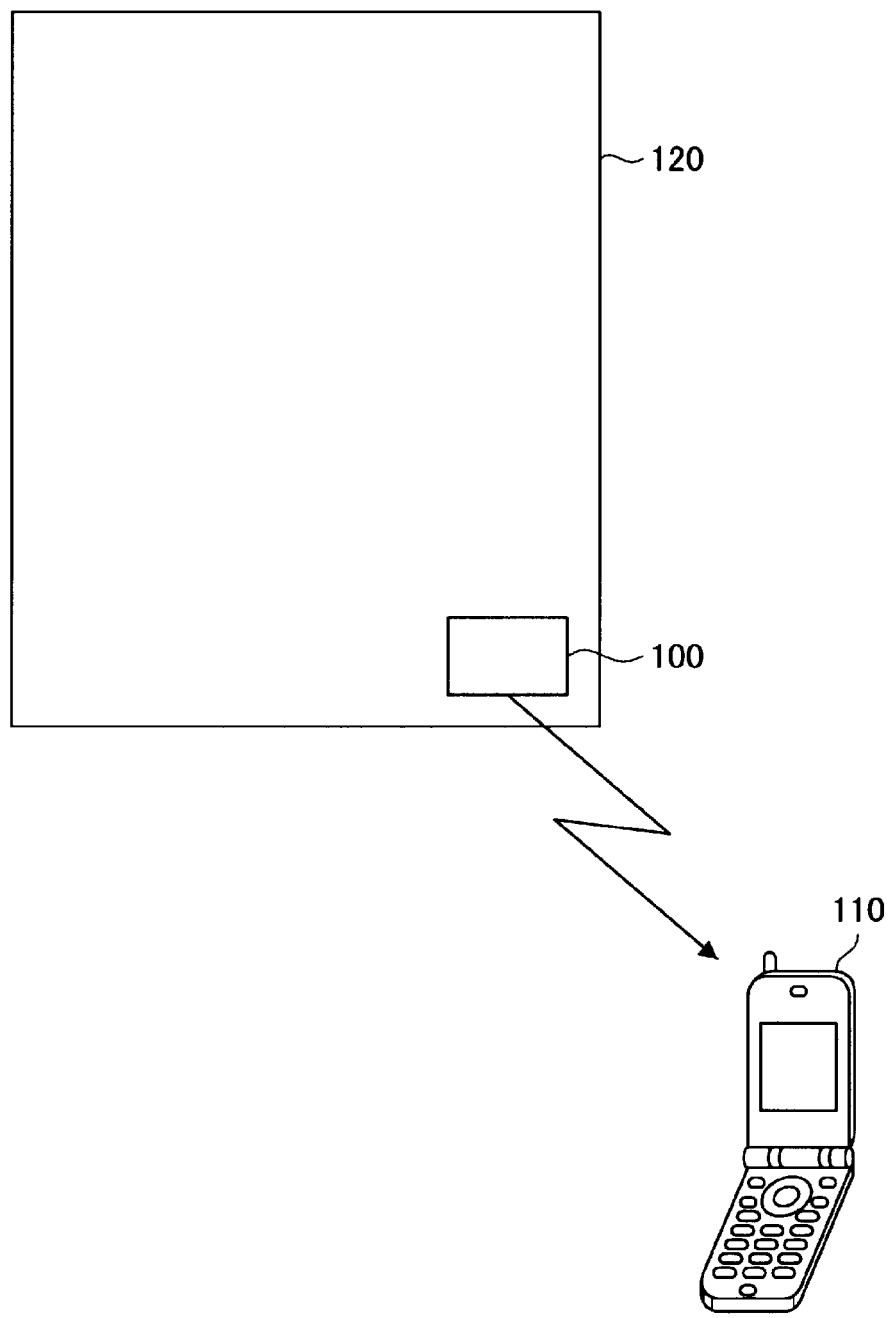
FIG. 1 is a block diagram illustrating the overall configuration of a data transfer system according to a first embodiment.

Preferred embodiments of the present disclosure will now be described in detail with reference to the attached drawings. Note that with regard to the present Specification and the drawings, components which have essentially the same functional configuration will be denoted with the same reference numerals, and redundant description thereof will be omitted.

Now, in the event of obtaining URLs or map information or the like related to the contents of an advertisement poster displayed in public, the information can be downloaded without contact simply by holding a portable terminal such as a cellular telephone or the like up to an IC tag or IC card embedded in the poster.

An example of such non-contact wireless communication which can be employed is NFC (Near Field Communication). The usable range of NFC is narrow, around 10 cm, and also has excellent security features, such as restricting the other party of communication by hand action. The advertisement poster in which an IC tag, or IC card is embedded, which are the object of data acquisition, are often exposed to the air, and accordingly non-contact wireless communication is effective.

First Embodiment

Data Transfer System

FIG. 1 is a block diagram illustrating the overall configuration of a data transfer system according to a first embodiment. This data transfer system includes a data accumulation device 100 in which data is accumulated, and a data acquisition device 110 for acquiring data from the data accumulation device wirelessly.

The data accumulation device 100 detects that the data acquisition device 110 is within a communicable range, and starts data transmission. The data acquisition device 110 acquires the data, and accordingly can make reference to the data, and acquire new serves by additional processing.

The data accumulation device 100 is placed in a tangible entity 120 such as a poster or the like. The tangible entity 120 includes public objects such as advertisements, posters, bulletins, signs, and so forth, and can be used for giving users some sort of information. The IC tags or IC cards serving as data accumulation devices 100 which are placed in such tangible entities 120 may be configured without independent power sources, so as to operate by receiving electric power supply from other electronic devices wirelessly.

The data acquisition device 110 is provided separately from the above data accumulation device 100, and is carried out in the form of a cellular telephone, PDA (Personal Digital Assistant), mobile personal computer, wristwatch, calculator, mouse, or the like, which can be transported by the user.

The manager of the tangible entity 120 which is a poster or the like writes information relating to the contents of the poster (URL, general information, detailed information, map information, fees, date-and-time, etc.) to the IC tag serving as the data accumulation device 100, either at the time of putting up the poster, or beforehand. In the event that a user is interested in the contents of the poster, the user brings the data acquisition device 110 close to the IC tag of the poster in order to record the contents of the poster or to obtain new information, and accordingly downloading is started by simple operations.

For obtaining information related to the poster from the data accumulation device 100 embedded in the poster, processing procedures which have been employed in the past involved first reading all of the data saved in the data accumulation device 100 into the portable terminal, and then starting processing with applications in the portable terminal. However, in recent years, the amount of information to be acquired has increased to more than 10 KB for example, but the wireless communication speed such as 212 Kbps for example cannot be changed, so the amount of time over which the devices are restricted for information acquisition has been increasing. Accordingly, with NFC, the data acquisition device 110 must be kept held up to the data accumulation device 100 as long as it takes to complete the wireless communication.

With such a communication standard, in the event that the data accumulation device 100 has data of a great size and multiple types, data which does not need to be transmitted may be automatically transmitted depending on the specifications of the data acquisition device 110, and in the event that the communication speed for obtaining the data is slow, a considerable amount of time may be consumed for the data acquisition.

Figure 2:
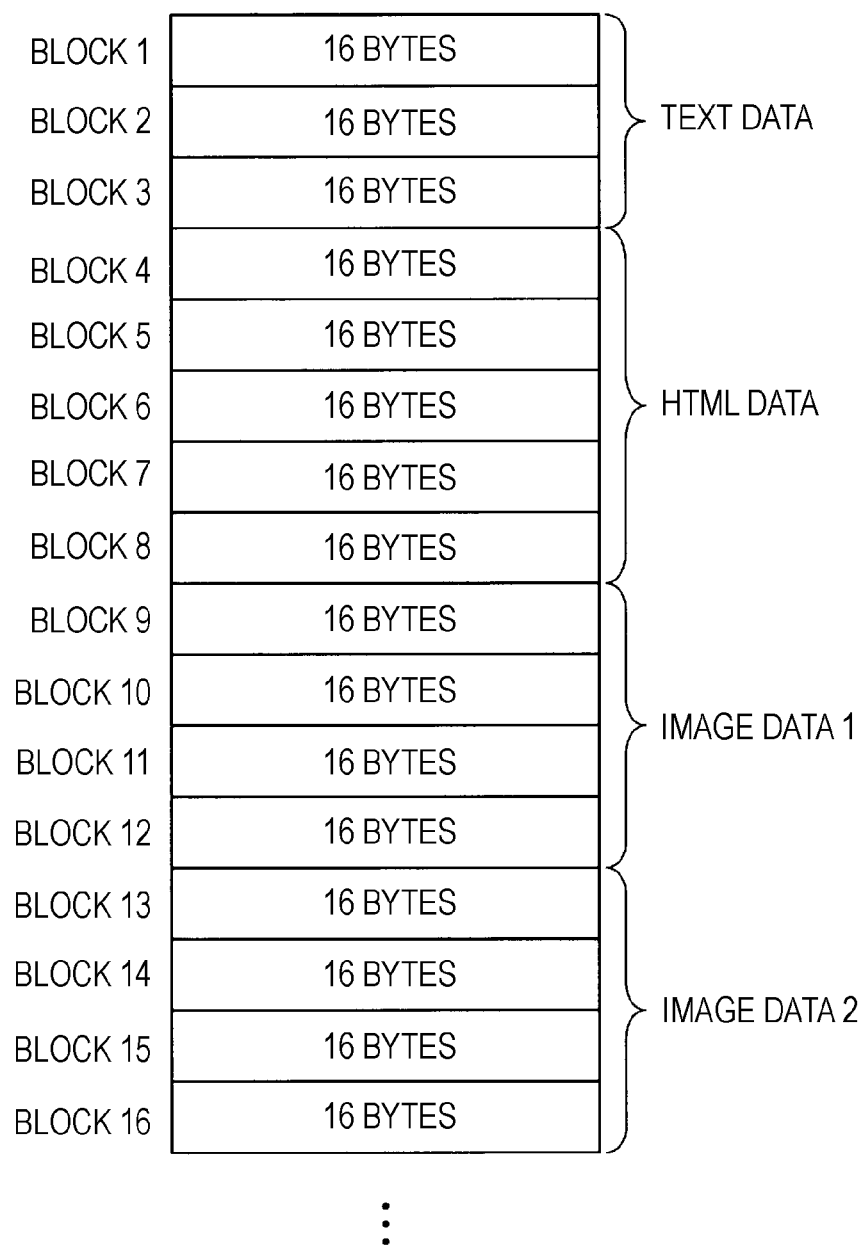
FIG. 2 is an explanatory diagram for describing the configuration of data saved by a data accumulation device.

FIG. 2 is an explanatory diagram for describing the configuration of data saved in the data accumulation device 100. Looking at FIG. 2, the data is sectioned into 16-byte blocks. The above-described NFC exchanges data in the 16-byte blocks.

For example, in the example shown in FIG. 2, text data is stored in blocks 1 through 3, HTML data in blocks 4 through 8, image data 1 in blocks 9 through 12, and image data 2 in blocks 13 through 16. While the block sectioning and the sectioning between different types of data are illustrated in a matching manner to facilitate understanding, NFC is not restricted to this, and sectioning of different types of data may exist within a block.

Now, the text data is used by a data acquisition device 110 capable of handling text, and the HTML data, image data 1, and image data 2, are used by an HTML-compatible data acquisition device 110.

In other words, with a text-based data acquisition device 110, only the text data is necessary here, and the remaining HTML data, image data 1, and image data 2 are unnecessary. On the other hand, with an HTML-compatible data acquisition device 110, the HTML data, image data 1, and image data 2 are the necessary data, and the text data is the unnecessary data.

With such past communication standards, data processing is started only after all of the data is read in, regardless of whether the data is necessary or unnecessary. With an embodiment according to the present disclosure, the data type of the data being received in 16-byte increments is determined, and accordingly saving or acquiring of unnecessary data can be avoided.

The data acquisition device 110 and data accumulation device 100 making up the data transfer system will be described in detail below.

Second Embodiment

Data Acquisition Device 110

Figure 3:
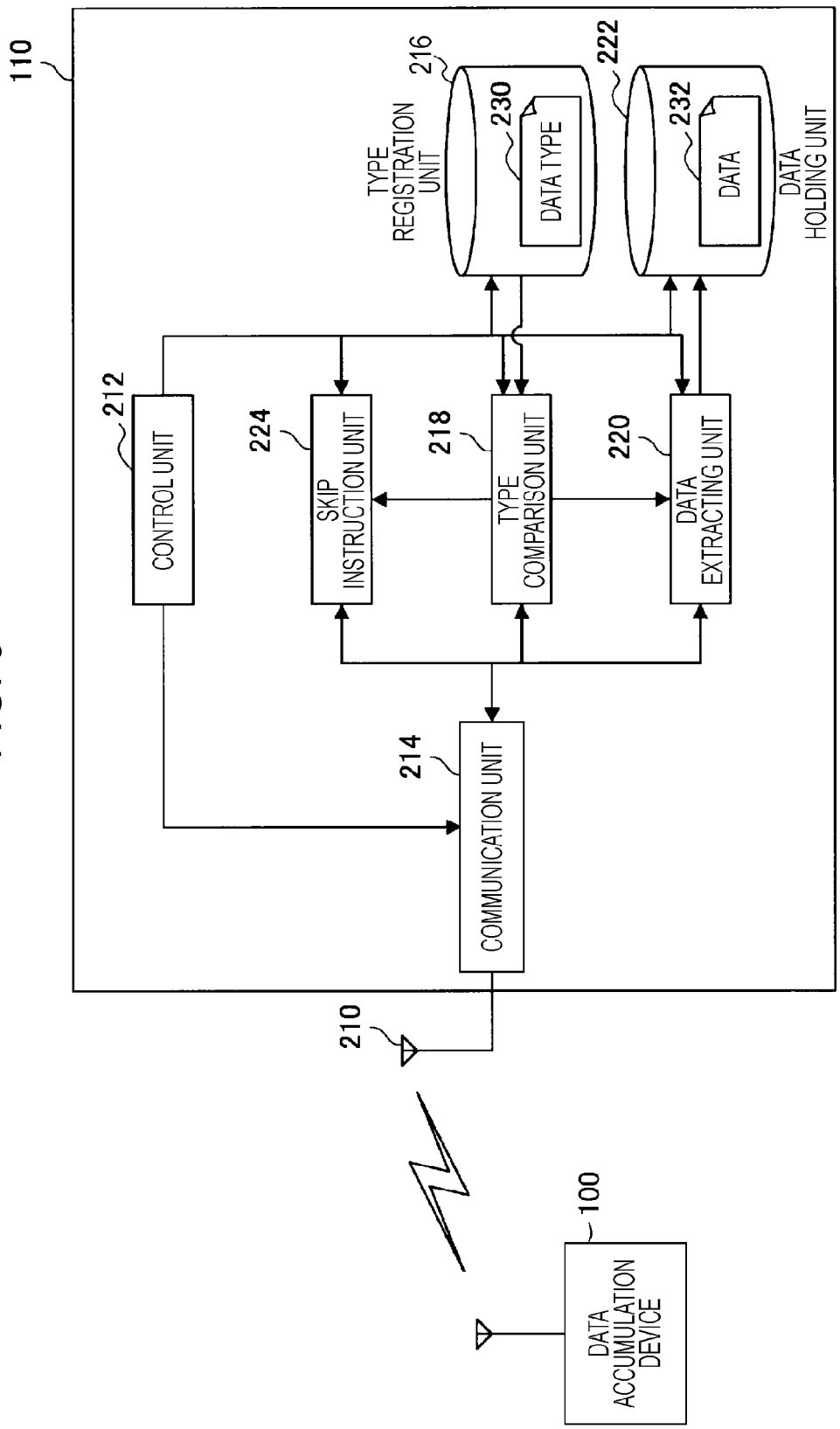
FIG. 3 is a block diagram illustrating the overall configuration of a data acquisition device according to a second embodiment.

FIG. 3 is a block diagram illustrating the overall configuration of the data acquisition device 110 according to a second embodiment. The data acquisition device 110 is configured including an antenna 210, an acquisition control unit 212, an acquisition communication unit 214, a type registration unit 216, a type comparison unit 218, a data extracting unit 220, an acquisition holding unit 222, and a skip instruction unit 224.

The antenna 210 has at least a communication band capable of the above-described NFC wireless communication, and may be formed as a loop antenna, for example.

The acquisition control unit 212 manages and controls the overall data acquisition device 110 by a semiconductor integrated circuit including a CPU (Central Processing Unit).

The acquisition communication unit 214 performs wireless communication of data with the data accumulation unit 100. The acquisition communication unit 214 is configured of, for example, an RF circuit, modulation/demodulation circuit, encoder, decoder, and so forth.

The type registration unit 216 has registered therein data type 230, for data necessary due to restrictions in processing capabilities of the data acquisition device 110, or data which the user of the data acquisition device 110 needs, such as "text data", for example. This registration may be made by the data acquisition device 110 upon determining its own processing capabilities, or may be registered by the user of the data acquisition device 110.

Also, the type registration unit 216 may have registered therein data types of unnecessary data, separate from a configuration wherein data types of necessary data are registered. With a configuration wherein necessary data types are registered in the type registration unit 216 and data of types other than those data, types are deleted as unnecessary data, there is the problem that predicting and registering unknown data types and yet-to-be-created data types so as to not be deleted is unrealistic. Accordingly, registering unnecessary data types in the data acquisition device 110 enables necessary data to be acquired in a sure manner, without deleting necessary data as unnecessary.

Further, the type registration unit 216 may have registered therein both necessary data types and unnecessary data types. With such an arranging, in the event that a data type is encountered which does not belong to either, the user may confirm the data type, and register the data type as being either necessary or unnecessary again.

The type comparison unit 218 compares the data type of the data received via the acquisition communication unit 214 (sub-data) with the data types registered in the type registration unit 216. Due to such a configuration, whether or not data (sub-data) received is necessary data can be determined from the data type.

The data extracting unit 220 extracts only data regarding which the data type has matched at the type comparison unit 218. Also, in the event that unnecessary data types are registered in the type comparison unit 218, the data extraction unit 220 does not extract data of those data types.

The data received from the data accumulation device 100 is structured of sub-data units distinguished by data type, and each sub-data unit is structured of sub-data unit header information including data type and data length in that order, followed by a data body.

Figure 4:
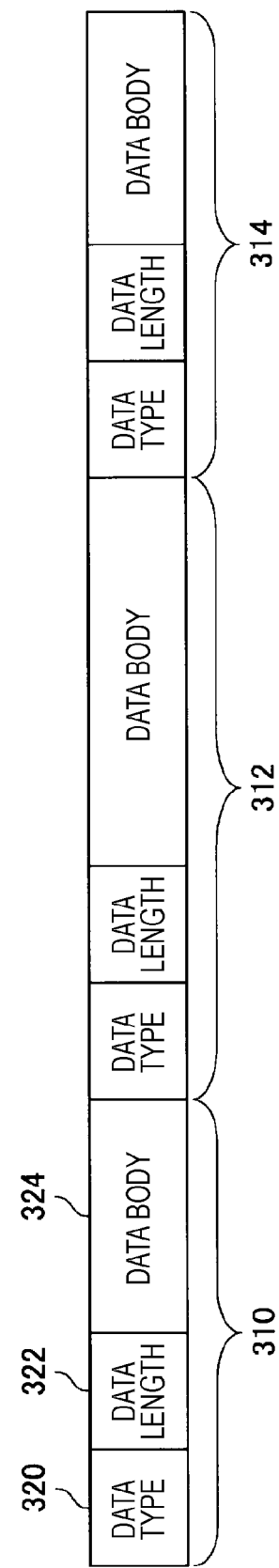
FIG. 4 is a data configuration diagram for describing data configuration.

FIG. 4 is a data configuration diagram for describing this data configuration. In FIG. 4, we see that the sub-data 310, 312, and 314, which can be recognized as data types, each have data type, data length, and data body, in that order. The data type 320 in the sub-data 310 indicates data attributes, such as "text data", "HTML data", "image data", "audio data", and so forth, and the data length 332 indicates the byte length of the data body 324 belonging to that data type 320. The maximum length of the data length section of the header information may be 4 bytes.

The data length 322 may be made longer than the actual data body 324, taking into consideration the fact that data may be added to the data body 324 in the future, so that for example, in the event that the data body 324 is 20 bytes in length, the data length 322 may be set to 50 bytes, so as to set the difference of 30 bytes as a reserved region.

The data extracting unit 220 skips extracting of the data body 324 for the number of bytes listed in the data length 322 in the event that determination is made at the type comparison unit 218 that the data type does not match. Consequently, this configuration wherein the data length 322 is referred to allows an accurate understanding of how far the unnecessary data goes, enables determination of what data types are included in each received block, and so forth, thereby enabling unnecessary data to be efficiently removed without involving other processes which would waste time, resources, etc.

The data received from the data accumulation device 100 may be sectioned into 16-byte blocks. For example, with the above-described NFC used for non-contact wireless communication, data units are structured of 16-byte blocks, as described with reference to FIG. 2. This arrangement wherein the data is configured of greater block increments and more detailed individual byte increments enables the start point and end point of unnecessary data to be speedily and easily specified.

The acquisition holding unit 222 holds the data 232 extracted by the data extracting unit 220. Such a configuration where only the necessary data 232 is saved enables the efficiency of subsequent data processing to be improved.

A user having the data acquisition device 110 can freely read the data 232, and can perform further processing, such as finding out the geographical location of a target location from a URL included in the read data (content) 232, for example.

The skip instruction unit 224 causes the data accumulation device 100 to skip transmission of data regarding which the data type did not match at the type comparison unit 218. For example, with the above-described NFC used for non-contact wireless communication, data is transmitted in 16-byte units.

In the event that an unnecessary data block is encountered at the time of communication confirmation, the skip instruction unit 224 transmits an instruction to the data accumulation device 100, to the effect to stop transmission of the unnecessary data block.

Figure 5:
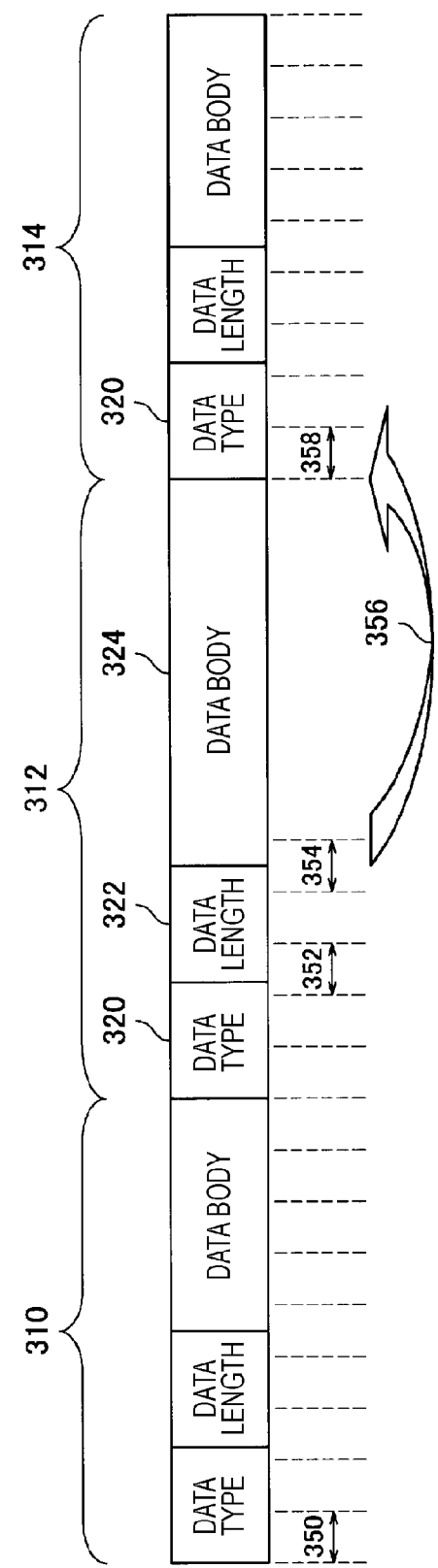
FIG. 5 is a data configuration diagram for describing skipping of transmission at the data accumulation device.

FIG. 5 is a configuration diagram for describing skipping of transmission from the data accumulation device 100. As described with reference to FIG. 4, the data transmitted from the data accumulation device 100 is divided into sub-data units 310, 312, and 314, each having header information of data type 320 and data length 322, and data body 324, which can be recognized as data types, in that order. Also, besides the above-described structure, the data is divided into 16-byte blocks 350. Accordingly, the type comparison unit 218 receives the 16-byte blocks, connects these with already-received blocks, and determines the data type and so forth.

The type comparison unit 218 reads in the data up to block 352, compares the data type 320 of the sub-data 312 with the data type 230 registered in the type registration unit 216, and finds out that the data body 324 of the sub-data 312 is unnecessary. The type comparison unit 218 further reads in blocks, and upon reading in block 354 knows the length (byte length) of the unnecessary data body 324 from the data length 322. The skip instruction unit 224 transmits to the data accumulation device 100 the number of blocks regarding which transmission needs to be omitted, or a block number indicating the same, such that the blocks representing the data body 324 are skipped.

Accordingly, transmission of blocks of that portion is stopped as indicated by the arrow 356 shown in FIG. 5, and transmission is resumed from the block 358 including the data type 320 for the subsequent sub-data 314.

With such a configuration, unnecessary transmission related to unnecessary data from the data accumulation device 100 can be restricted, and data can be efficiently received in a short time even in cases wherein the communication speed with the data accumulation device 100 is slow.

Now, an arrangement may be made wherein, in the event that the data accumulation device 100 is of a conventionally-used type without a data format of data type, data length, and data body such as described above, the type comparison unit 218 recognizes this fact and simply reads in the data in sequential order, without any change to the data.

Also provided is a program which causes a computer to function as the data acquisition device, and a recording medium storing the program.

Specific Circuit Configuration

Figure 6:
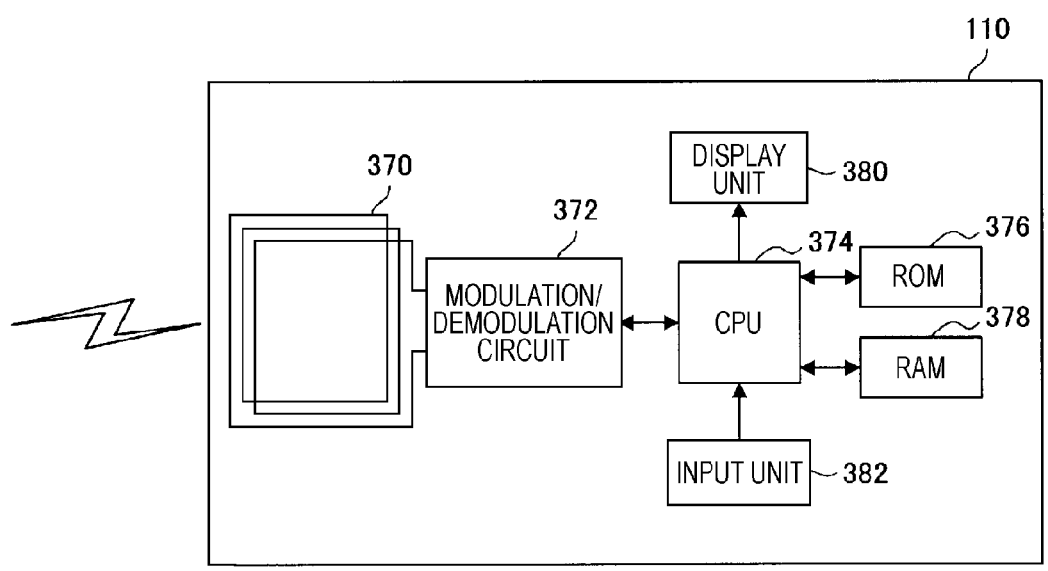
FIG. 6 is a circuit block diagram illustrating the overall configuration of a data acquisition device 100 according to the second embodiment.

FIG. 6 is a circuit block diagram illustrating the overall configuration of the data acquisition device 110 according to the second embodiment. The above-described data acquisition device 110 is illustrated with a more specific circuit here.

The data acquisition device 110 includes a loop antenna 370, a modulation/demodulation circuit 372, a CPU 374, ROM 376, RAM 378, a display unit 380, and an input unit 382.

The loop antenna 370 forms multiple loops, for improving reception sensitivity in a small space, thereby enabling the NFC communication band.

The modulation/demodulation circuit 372 modulates data to be transmitted to the data accumulation device 100 according to NFC, and also demodulates modulation waves from the data accumulation device 100 into data.

The CPU 374 is a semiconductor integrated circuit for performing signal processing, managing and controlling the overall data acquisition device 110. The ROM 376 stores beforehand programs for controlling the data acquisition device 110, to be read to the CPU 374. The RAM 378 is used as area for temporarily storing certain data for the CPU 374 to function as the data acquisition device 110, for storing variables, and so forth.

The display unit 380 is a monochrome or color display for displaying data read from the data accumulation device 100. The input unit 382 is configured of a key input unit (not shown) such as a keyboard, numeric keypad, or the like, for supporting the display functions of the display unit 380 and also for use in selection of data types.

Third Embodiment

Data Accumulation Device 100

Figure 7:
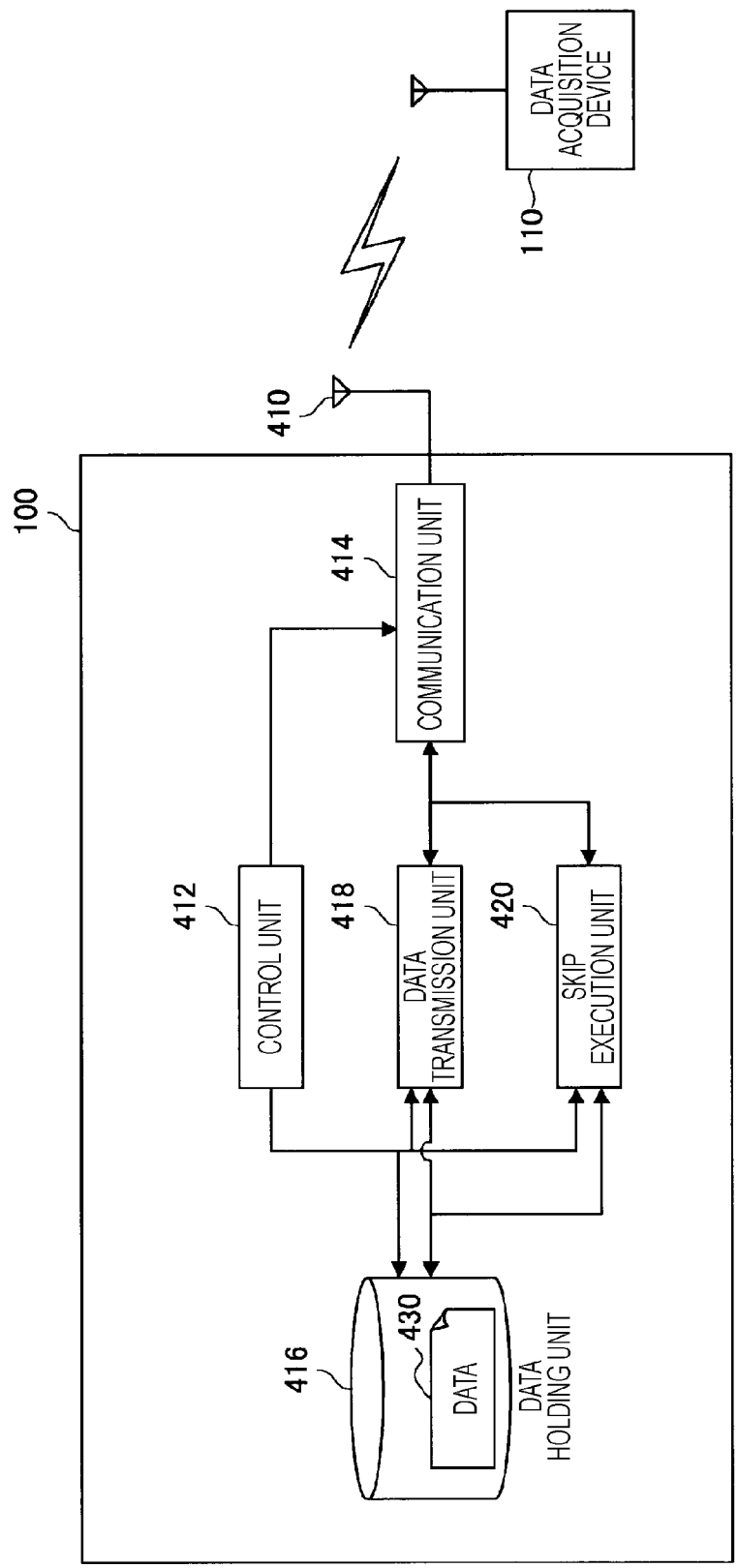
FIG. 7 is a block diagram illustrating the overall configuration of a data accumulation device according to a third embodiment.

FIG. 7 is a block diagram illustrating the overall configuration of the data accumulation device 100 according to a third embodiment. The data accumulation device 100 is configured including an antenna 410, an accumulation control unit 412, an accumulation communication unit 414, an accumulation holding unit 416, a data transmission unit 418, and a skip execution unit 420.

The antenna 410 has at least a communication band capable of NFC wireless communication, and may be formed as a loop antenna, for example.

The accumulation control unit 412 manages and controls the overall data accumulation device 100 by a semiconductor integrated circuit including a CPU (Central Processing Unit).

The accumulation communication unit 414 performs wireless communication of data with the data acquisition unit 110. The accumulation communication unit 414 is configured of, for example, an RF circuit, modulation/demodulation circuit, encoder, decoder, and so forth, for example.

The accumulation holding unit 416 converts information which the user desires into a data format which the user can refer to. Referring to this data enables the user to obtain URLs and map information relating to the contents of an advertisement poster, for example.

In the event that the data acquisition device 110 is within a communicable range, e.g., in the event that the wireless communication method used is NFC and the data acquisition device 110 is without around 10 cm of the data accumulation device 100, the data transmission unit 418 transmits the data stored in the accumulation holding unit 416 to the data acquisition device 110 via the accumulation communication unit 414. An arrangement may be made wherein, in the event that a data acquisition device 110 is automatically detected within the communicable range, communication between the data accumulation device 100 and the data acquisition device 110 is automatically started following mutual authentication.

As described above with the second embodiment, sub-data sectioned by data types each have data type, data length, and data body, in that order. This configuration including the data length allows an accurate understanding of how far the unnecessary data goes, thereby enabling unnecessary data to be efficiently skipped without involving other processes which would waste time, resources, etc.

The skip execution unit 420 skips transmission of predetermined data types (data body) in response to skip instructions from the skip instruction unit 224 of the data acquisition unit 110. Also, the skip execution unit 420 may be arranged to skip data body of a length indicated in the data length belonging to a certain data type, in response to instructions from the data acquisition device 110. This skipping of data has already been described with reference to FIG. 5 in the second embodiment, so description thereof will be omitted here.

In the event that the data acquisition device 110 which is the communication object has a skip instruction unit 224, unnecessary transmission of unnecessary data can be restricted in accordance with instructions from the skip instruction unit 224, and data can be efficiently received in a short time even in cases wherein the communication speed with the data accumulation device 100 is slow.

The data accumulation device may be a non-contact IC tag or IC card provided on a poster or the like. This does away with the need to have a conspicuous-looking electronic device provided on the poster, thereby improving the external appearance of the poster. Further, no electric power source is required, so maintenance costs can also be reduced.

Also provided is a program which causes a computer to function as the data accumulation device, and a recording medium storing the program.

Specific Circuit Configuration

Figure 8:
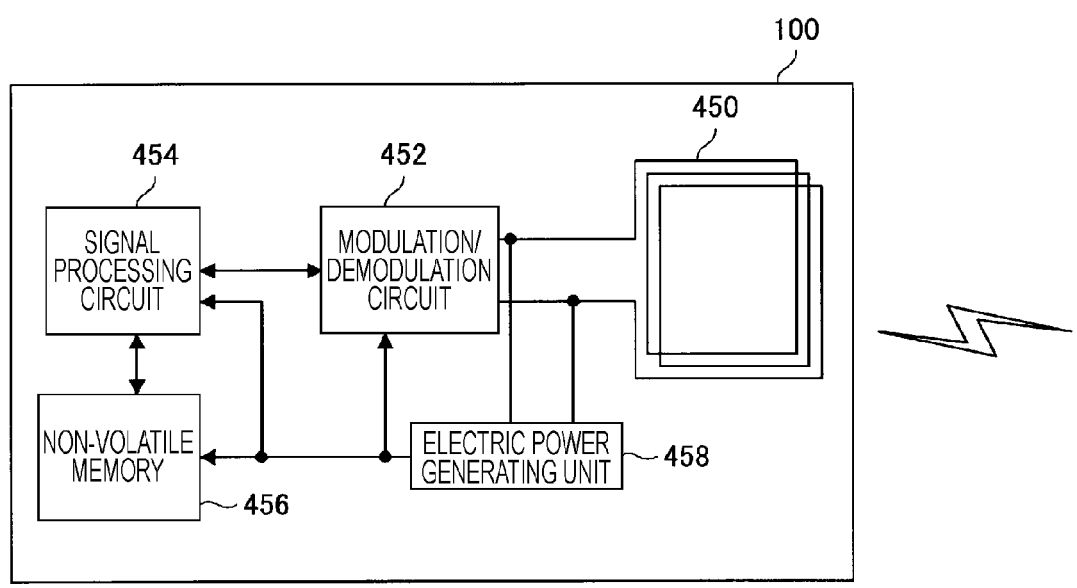
FIG. 8 is a circuit block diagram illustrating the overall configuration of the data accumulation device according to the third embodiment.

FIG. 8 is a circuit block diagram illustrating the overall configuration of the data accumulation device 100 according to the third embodiment. The above-described data accumulation device 100 is illustrated with a more specific circuit here.

The data accumulation device 100 includes a loop antenna 450, a modulation/demodulation circuit 452, a signal processing circuit 454, non-volatile memory 456, and an electric power generating unit 458.

The loop antenna 450 forms multiple loops, for improving reception sensitivity even in a small space, thereby enabling the NFC communication band. Depending on the communication standard and carrier wave frequency used, an antenna built into the IC chip may suffice without necessitating use of the loop antenna 450.]

The modulation/demodulation circuit 452 modulates data to be transmitted to the data acquisition device 110 according to NFC, and also demodulates modulation waves from the data acquisition 110 device 110 into data.

The signal processing circuit 454 is a semiconductor integrated circuit for performing signal processing, managing and controlling the overall data accumulation device 100. The non-volatile memory 456 serves as both ROM and RAM, and the stored contents are not erased even when the power is off. Accordingly, in the event that the manager of the data accumulation device 100 rewrites the data and then the data accumulation device 100 is left in a powerless state, the data is still preserved.

The electric power generating unit 458 converts electric waves from the data acquisition device 110 into electric power as long as communication with the data acquisition device 110 is maintained, and supplies the power to the modulation/demodulation circuit 452, signal processing circuit 454, and non-volatile memory 456. Thus, the electric power generating unit 458 must supply power to the circuits from a limited source of electric waves, so low-power-consumption devices are used for the circuits as much as possible.

Further, the data acquisition device 110 and the data accumulation device 100 may be configured of a single device. Further, the accumulation holding unit 416 of the data accumulation device 100 and the acquisition holding unit 222 of the data acquisition device 110 may be separately provided so as to communicate via the Internet or the like, and the components of the data acquisition device 110 may be provided dispersed among separate devices.

Fourth Embodiment

Data Acquisition Method

Next, a data acquisition method for acquiring data from the data accumulation device 100 by wireless communication using the data acquisition device 110 will be described.

FIG. 9 is a flowchart illustrating the flow of the data acquisition method. In order to extract only data of certain types from the received data, first, data type registration is performed. The data acquisition device 110 determines whether or not to register a data type as data necessary due to processing capabilities of the data acquisition device 110 or data which the user of the data acquisition device 110 needs (S500). In the event that determination is made there that registration of the data type is necessary, e.g., in the event that the user opts for registration of data type, data type registration is performed (S502).

Data types include "name of event", "location", "dates", "map data", "address", "telephone number", and "fax number", from which selection can be made, and in the event that the user registers the data types of "dates" and "telephone number", the user can hold the data acquisition device 110 up to a poster carrying concern information for example, and obtaining the data and telephone numbers for that concert.

Holding the data acquisition device 110 up to the data accumulation device 100 starts communication between the two, and an arrangement may be made wherein the user can know that communication has started by notification using audio, LEDs, vibrations, and so forth. Now, whether or not there is reception data is confirmed (S510), and in the event that reception data exists, the data is received (S512), otherwise, the present data acquisition method ends.

The data is configured of multiple sub-data units, each sub-data unit being structured of header information including data type and data length, and a data body. The data acquisition device 110 repeats the data reception step (S512) until the data type and data length are acquired (S514).

Upon the data type and data length having been acquired, the data acquisition device 110 compares the data type (reception data type) received from the data accumulation device 100 with the data type (registered data type) registered in the type registration step (S502) in step S516, and in the event that the data types match, the data body following the data length is received (S518), and the received extracted data is held in the acquisition holding unit 222 (S520). Otherwise, the number of blocks which can be skipped is, calculated form the data length, and a skip instruction is issued to the data accumulation device 100 to skip transmission of the data body following the data length (S522).

Next, determination is made regarding whether or not the data (Sub-data) processing in this way is the final data (S524), and in the event that this is not the final data, the flow is repeated form the data reception step (S512). If this is the final data, the present data acquisition method ends. An arrangement may be made wherein the user of the data acquisition device 110 is notified of ending of data acquisition by audio, LEDs, vibrations, or the like, from either the data acquisition device 110 or the data accumulation device 100.

Fifth Embodiment

Data Transmission Method

Next, a data transmission method for wirelessly transmitting data to the data acquisition device 110 using the data accumulation device 100 will be described.

FIG. 10 is a flowchart illustrating the flow of the data transmission method. The data accumulation device 100 provides various types of information to the data acquisition device 110 as data. Accordingly, registration of data having such information is performed first. The data accumulation device 100 determines whether or not certain data is data to be registered to the data accumulation device 100 (S600). In the event that determination is made that data registration is necessary, the manager of the data accumulation device 100 performs registration of data using a password or the like, for example (S602).

Next, determination is made regarding whether or not the data acquisition device 110 is within communicable range of the data accumulation device 100 (S610). In the event that the data acquisition device 110 is detected in this object detection step (S610), preparation to transmit the data registered in the data registration step (S602) to the data acquisition device 110 is started. If no data acquisition device 110 is detected in the communicable range of the data accumulation device 100, the detection action (poling) is continued until the data acquisition device 110 is detected within the communicable range.

Subsequently, the data accumulation device 100 confirms whether or not there has been a skip instruction from the data acquisition device 110 (S612), and continues to transmit the registered data unless there has been a skip instruction (S614). Also, in the event that there has been a skip instruction from the data acquisition device 110, the data is skipped from the instructed number of blocks (S616), and transmission is resumed from the block including the next data type.

Next, determination is made regarding whether or not the data (sub-data) processed as described above is the final data (S618), and in the event that the data is not the final data, the flow is repeated from confirmation of the skip command (S612), otherwise, the present data transmission method ends.

According to the data acquisition method and data transmission method, saving or acquisition of unnecessary data can be restricted, and efficiency of data processing can be improved regardless of the communication standard and the communication speed thereof.

Now, while preferred embodiments of the present disclosure has been described with reference to the attached drawings, it is clearly understood that the present disclosure is not restricted by these examples. It should be understood by those skilled in the art that various modifications, combinations, sub-combinations and alterations may occur depending on design requirements and other factors insofar as they are within the scope of the appended claims or the equivalents thereof.

For example, with the above-described data acquisition method and data transmission method, a configuration wherein both the data type and data length are acquired by the data acquisition device before the data type is determined, but the present disclosure is not restricted to this configuration, and an arrangement may be made for example, wherein the data acquisition device issues a skip instruction to the data accumulation device based on determination of the data type alone, and the data accumulation device determines the length of the data body to be skipped form the data length, so as to start transmission from the next data type.

Also, the above-described embodiments involve non-contact wireless communication between the data acquisition device and the data accumulation device, but the present disclosure is not restricted to this configuration, rather, communication may be performed via cable or wirelessly, or by contact or non-contact.

It should be further noted that the steps of the data acquisition method and data transmission method in the present Specification are not restricted to being carried out in the time-sequence described in the flowcharts, and may be executed in parallel or individually (e.g., parallel processing, object-based processing).

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A data transfer system comprising:
a data accumulation device for accumulating data; and
a data acquisition device for acquiring data from the data accumulation device by wireless communication;
the data accumulation device including:
(a) a first wireless communication unit for performing wireless communication of data;
(b) a first data holding unit for holding data; and
(c) a data transmission unit for transmitting data held in the first data holding unit to the data acquisition device via the first wireless communication unit, in the event that the data acquisition device is within a communicable range; and
the data acquisition device including:
(a) a second wireless communication unit for performing wireless communication of data;
(b) a type registration unit wherein data types of necessary data are registered beforehand;
(c) a type comparison unit for:
comparing the data type of data received via the second wireless communication unit with data types registered in the type registration unit; and
determining a length of a data body of the data by reading a data length header included with the data;
(d) a data extracting unit for extracting only data of which the data type matches by using the length of the data body to skip extraction of the data body of the data that is determined to be unnecessary by the type comparison unit; and
(e) a second data holding unit for holding the extracted data.

2. A data acquisition device comprising:
a wireless communication unit for performing wireless communication of data with a data accumulation device in which data is accumulated;
a type registration unit wherein data types of necessary data are registered beforehand;
a type comparison unit for comparing the data type of data received via said wireless communication unit with data types registered in said type registration unit;
a data extracting unit for extracting data of which said data type matches; and
a data holding unit for holding said extracted data,
wherein the data is structured of a plurality of sub-data units distinguished by data type, with each sub-data unit including a data length,
and wherein the data extracting unit refers to the data length and skips extraction of the data associated with the sub-data unit corresponding to the data type determined to be unnecessary.

3. The data acquisition device according to claim 2, further comprising a skip instruction unit configured to transmit a message to the data accumulation device causing the data accumulation device to skip transmission of the data of which the data type has been determined to be unnecessary.

4. The data acquisition device according to claim 2, wherein each of the sub-data units is structured of sub-data unit header information including a data type and a data length followed by a data body;

and wherein the data extracting unit removes the data body with a length indicated in the data length when the data type is determined to be unnecessary.

5. The data acquisition device according to claim 2, wherein the type registration unit is configured to register data types of unnecessary data;

and wherein the data extraction unit omits extracting data of which the data type matches that of the unnecessary data.

6. The data acquisition device according to claim 2, wherein the wireless communication is performed using a Near Field Communication standard.

7. The data acquisition device according to claim 2, wherein the data is sectioned into 16-byte blocks.

8. A data acquisition method for acquiring data from a data accumulation device in which data is accumulated by wireless communication, the method comprising:
registering data types of necessary data;
receiving data from the data accumulation device;
comparing a data type of the received data to the registered data types;
extracting data of which the data type matches at least one of the registered data types; and
storing the extracted data for processing,
wherein the received data is structured of a plurality of sub-data units distinguished by data type, with each sub-data unit including a data length,
and wherein the extraction of data includes skipping extraction of the data associated with the sub-data unit corresponding to the data type determined to be unnecessary.

9. A data accumulation device comprising:
a wireless communication unit for performing wireless communication of data;
a data holding unit for holding data;
a data transmission unit for transmitting the data held in the data holding unit to the data acquisition device via the wireless communication unit when the data acquisition device is within a communicable range; and
a skip execution unit for causing transmission of data of predetermined data types to be skipped in response to at least one instruction from the data acquisition device,
wherein the data is structured of a plurality of sub-data units distinguished by data type, with each sub-data unit including a data length,
and wherein the skip execution unit refers to the data length and skips the data associated with the sub-data unit corresponding to the data type identified by the at least one instruction to be unnecessary.

10. The data accumulation device according to claim 9, wherein each sub-data unit includes sub-data unit header information including a data type and a data followed by a data body,
and wherein the skip execution unit causes the data body of the length indicated in the data length to be skipped for each of the sub-data units associated with at least one of the data types identified by the at least one instruction to be unnecessary.

11. The data accumulation device according to claim 9, wherein the wireless communication is performed using a Near Field Communication standard.

12. The data accumulation device according to claim wherein the data is sectioned into 16-byte blocks.

13. The data accumulation device according to claim 9, wherein the data accumulation device is an integrated circuit ("IC") tag.

14. A data transmission method comprising the steps of:
storing data;
detecting a data acquisition device is within a communicable range;
transmitting the data to the data acquisition device such that the data associated with a predetermined data type is skipped from transmission in response to at least one instruction received from the data acquisition device specifying the data type to be skipped,
wherein the data is structured of a plurality of sub-data units distinguished by data type, with each sub-data unit including a data length,
and wherein the data length is used to determine which of the data of the sub-data units is to be skipped for transmission based on which of the sub-data units are associated with a data type determined by the data acquisition device to be unnecessary.

* * * * *

UNITED STATES PATENT AND TRADEMARK OFFICE
CERTIFICATE OF CORRECTION

| | | |
|---|---|---|
| PATENT NO. | : 8,561,900 B2 | Page 1 of 1 |
| APPLICATION NO. | : 12/987707 | |
| DATED | : October 22, 2013 | |
| INVENTOR(S) | : Matsuo et al. | |

It is certified that error appears in the above-identified patent and that said Letters Patent is hereby corrected as shown below:

IN THE CLAIMS:

Col. 16, line 20, Claim 12 should read as follows:

12. The data accumulation device according to claim 9 wherein the data is sectioned into 16-byte blocks.

Signed and Sealed this
Fourth Day of March, 2014

Michelle K. Lee
*Deputy Director of the United States Patent and Trademark Office*